(12) United States Patent
Soga et al.

(10) Patent No.: US 7,860,940 B2
(45) Date of Patent: Dec. 28, 2010

(54) SYSTEM AND METHOD FOR BUS TRANSMISSION CANCELLATION

(75) Inventors: Yuki Soga, Kyoto (JP); Daisuke Murakami, Kyoto (JP); Takahide Baba, Hyogo (JP); Yuji Takai, Osaka (JP); Yasuo Nishioka, Osaka (JP)

(73) Assignee: Panasonic Corporation, Osaka (JP)

( * ) Notice: Subject to any disclaimer, the term of this patent is extended or adjusted under 35 U.S.C. 154(b) by 376 days.

(21) Appl. No.: 12/058,566

(22) Filed: Mar. 28, 2008

(65) Prior Publication Data

US 2008/0244029 A1    Oct. 2, 2008

(30) Foreign Application Priority Data

Mar. 30, 2007    (JP)    .............................. 2007-090540

(51) Int. Cl.
*G06F 13/00*    (2006.01)
(52) U.S. Cl. ........................ 709/210; 709/209; 710/110; 710/200
(58) Field of Classification Search .................. 709/208, 709/209, 210; 710/107, 110, 200, 240
See application file for complete search history.

(56) References Cited

U.S. PATENT DOCUMENTS

| 5,392,404 | A  | * | 2/1995  | Thompson ..................... 710/40 |
| 5,574,945 | A  |   | 11/1996 | Elko et al. |
| 6,219,735 | B1 | * | 4/2001  | Kondo et al. ................. 710/110 |
| 6,581,116 | B1 | * | 6/2003  | Arimilli et al. ............... 710/110 |
| 7,076,719 | B2 | * | 7/2006  | Anjo et al. .................... 714/749 |
| 7,441,141 | B2 | * | 10/2008 | Poustchi et al. ................ 714/4 |

FOREIGN PATENT DOCUMENTS

JP    11-312102    11/1999

* cited by examiner

*Primary Examiner*—Viet Vu
(74) *Attorney, Agent, or Firm*—McDermott Will & Emery LLP

(57) ABSTRACT

A transmission cancellation section is provided on a bus connecting a master and a slave. During a reset of the master, the transmission cancellation section blocks the bus so that an invalid command flowing on the bus does not reach the slave and executes, instead of the master stopped by the reset operation, generation of data which corresponds to an access request command already output to the slave and is to be sent to the slave and receiving of data from the slave.

15 Claims, 7 Drawing Sheets

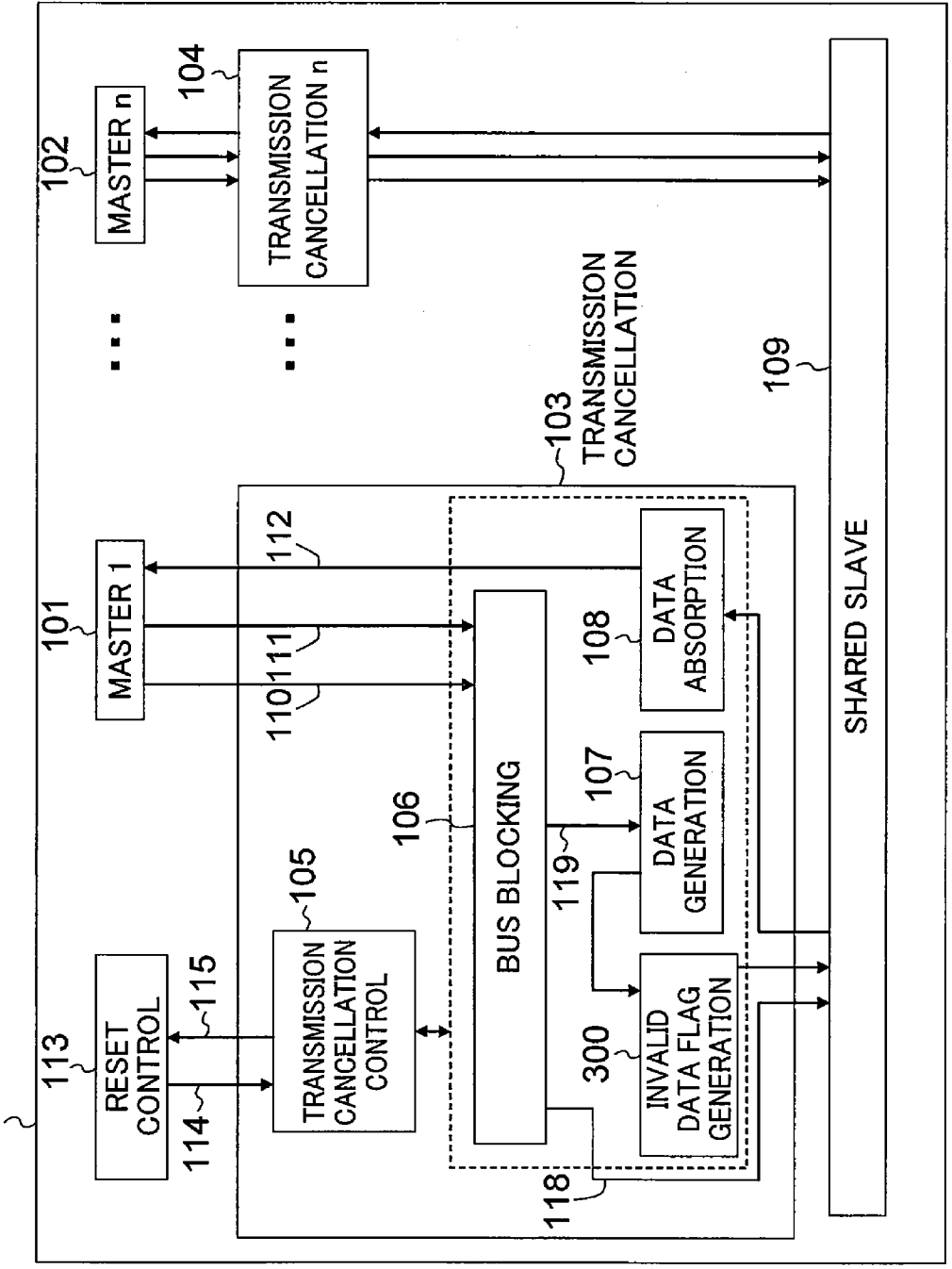

US 7,860,940 B2

SYSTEM AND METHOD FOR BUS TRANSMISSION CANCELLATION

BACKGROUND OF THE INVENTION

1. Field of the Invention

The present invention relates to a data processing system including a master and a slave which perform data communication therebetween.

2. Description of the Prior Art

In a system LSI including a plurality of masters which share one or more slaves via buses, the function of performing a master reset when a fault occurs in some of the masters during an operation of the system has to be provided. Herein, a master is a microprocessor, DSP (Digital Signal Processor), DMA (Direct Memory Access) controller, or the like and a slave is a memory, peripheral I/O (input/output) controller, or the like.

According to a known technique disclosed in Japanese Laid-Open Publication No. H11-312102, when a fault occurs in one of devices connected to a bus and thus is to be reset, the system is recovered from the fault in such a manner that all the devices are temporarily stopped first, fault information is collected, and a resister that needs resetting is reset and cleared.

However, when one of masters operating a system has to be reset and, in order to recover the system, operations of all the masters are temporarily stopped, the other ones of the masters which are irrelevant to the reset are influenced, so the performance of the system is largely affected.

In addition, to stop an operation of a master and increase the speed of a recovery operation, a special function has to be provided additionally to a master and a slave. In such a case, for example, if IP (Intellectual Property) owned by another company is used in a master and a slave or if it is difficult to make modifications for some other reasons, the problems can not be solved.

Moreover, even in a system in which a single master performs data communication with a slave, if a command which has been already issued by the master in a state of being incapable of executing data transmission remains in the slave, some error occurs in a system recovery operation.

SUMMARY OF THE INVENTION

The present invention has been devised to solve the above-described problems of the known technique and it is therefore an object of the present invention to realize a master reset without influencing the operation of an entire system.

To solve the above-described problem, according to the present invention, a transmission cancellation section executes and completes a transmission operation between a master and a slave when the master is in a state of being incapable of executing a data transmission operation.

Specifically, the transmission cancellation section includes a bus blocking section for blocking issuance of a command and transmission of data from the master to the slave, a data generation section for generating, instead of the master, data to be sent to the slave according to the command already issued to the slave, a data absorption section for receiving, instead of the master, response data corresponding to the command already issued to the slave and output from the slave, and a transmission cancellation control section for controlling the bus blocking section, the data generation section and the data absorption section.

Thus, when a master reset is performed during an operation of a system, the transmission cancellation section blocks data from a master which is in the reset operation and completes, instead of the master, an operation of the slave, thereby canceling a transmission command already issued to the slave.

According to the present invention, even when one master is reset during an operation of a system, recovery of the system is possible without resetting a slave, and also an operation of the other master does not have to be stopped. That is, the master needing recovery can be reset without influencing operations of the slave and other masters than the master to be reset.

In addition, the transmission cancellation section of the present invention can be inserted on a bus connecting a master and a slave, so modification does not have to be made to either one of circuits of the master and the slave.

BRIEF DESCRIPTION OF THE DRAWINGS

FIG. 5 is a block diagram of a data processing system according to a third embodiment of the present invention.

DESCRIPTION OF THE PREFERRED EMBODIMENTS

Hereafter, embodiments of the present invention will be described in detail with reference to the accompanying drawings.

First Embodiment

Figure 1:
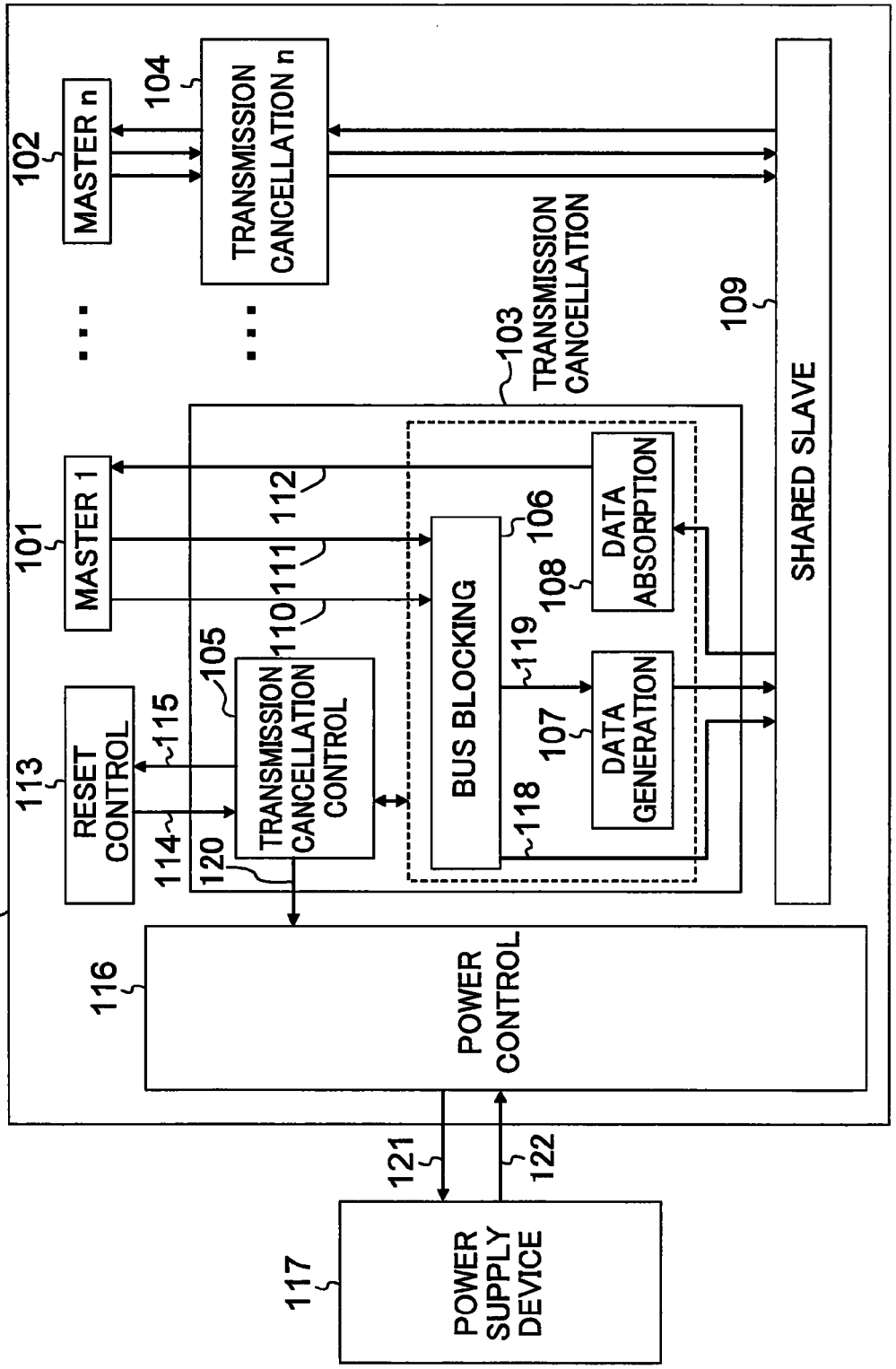
FIG. 1 is a block diagram of an electronic apparatus including a data processing system according to a first embodiment of the present invention.

FIG. 1 is a block diagram illustrating a configuration of an electronic apparatus including a data processing system according to a first embodiment of the present invention. The "electronic apparatus" herein is arbitrary equipment, such as a cellular phone, a DVD recorder or the like.

The electronic apparatus of FIG. 1 includes a power supply device 117 and a semiconductor integrated circuit 100 having a power control section 116. The power supply device 117 supplies power to the semiconductor integrated circuit 100 via a power line 122. The power control section 116 distributes power to each block in the semiconductor integrated circuit 100 and controls power supply from the power supply device 117 via a power control signal line 121 according to a state of each block.

Next, an internal configuration of the semiconductor integrated circuit 100 will be described in detail. The semiconductor integrated circuit 100 of FIG. 1 includes, in addition to the power control section 116, a plurality of masters 101 and 102, a plurality of transmission cancellation sections 103 and 104, a shared slave 109 and a reset control section 113. 110, 111 and 112 are buses for connecting the master 101 and the shared slave 109. 110 is a command bus for sending an access request command to the shared slave 109, 111 is a write data bus for sending write data to the shared slave 109 and 112 is a read data bus for sending read data from the shared slave 109. Each of the masters 101 and 102 is, for example, a microprocessor, a DSP (Digital Signal Processor), a DMA (Direct Memory Access) controller, or the like. The shared slave 109 is a memory, a peripheral I/O (input/output) controller or the like.

The reset control section 113 is a block for controlling reset of the master 101 and 102 and the shared slave 109. The reset control section 113 is connected to the transmission cancellation section 103 via signal lines 114 and 115 and performs control of the transmission cancellation section 103. The other transmission cancellation section 104 is also controlled by the reset control section 113 in the same manner.

The transmission cancellation section 103 is inserted on the buses 110, 111 and 112 for connecting the master 101 and the shared slave 109. The other transmission cancellation section 104 is also inserted on a bus for connecting the master 102 and the shared slave 109 in the same manner.

The transmission cancellation section 103 includes a transmission cancellation control section 105, a bus blocking section 106, a data generation section 107 and a data absorption section 108.

The transmission cancellation control section 105 receives an instruction from the reset control section 113 via the signal line 114 and performs control of start/end of an operation or the like of blocks in the transmission cancellation section 103. The transmission cancellation control section 105 notifies the reset control section 113 of a state of the transmission cancellation section 103 such as the completion of transmission cancellation or the like via the signal line 115. The power control section 116 is notified of the state of the transmission cancellation section 103 by a signal line 120. The power control section 116 confirms whether each block is operated according to a state signal from each block in the semiconductor integrated circuit 100 as well as information of the signal line 120 to determine which block needs power supply. For example, when access from all the masters 101 and 102 to the shared slave 109 is stopped and the transmission cancellation section 103 does not execute a transmission cancellation operation, power supply to the shared slave 109 and the transmission cancellation section 103 is stopped, thereby suppressing power consumption.

The bus blocking section 106 stops a data receiving operation from the command bus 110 and the write data bus 111 according to control by the transmission cancellation control section 105, thereby blocking buses so as to prevent transmission to the shared slave 109. For example, when a command and data are transmitted by a handshaking using a transmission request signal from the master 101 and a receiving enabled signal from the shared slave 109 in the command bus 110 and the write data bus 111, the receiving enabled signal to be sent to the master 101 is negated in the bus blocking section 106 and the transmission request signal to the shared slave 109 is negated, thereby allowing bus blocking. A command output signal line 118 and a write data output signal line 119 from the bus blocking section 106 correspond to the command bus 110 and the write data bus 111, respectively. The bus blocking section 106 blocks a command and data flowing through the command bus 110 and the write data bus 111 during a transmission cancellation operation, and lets the command and data pass as they are during a normal operation.

The data generation section 107 receives an instruction of transmission cancellation from the transmission cancellation control section 105 and generates, instead of the master 101 whose operation is stopped by reset, dummy data to the shared slave 109. For example, if the shared slave 109 is configured so as not to receive data exceeding a data transmission amount requested by a command that the shared slave 109 has received, a transmission request signal to the shared slave 109 is asserted at all the time.

The data absorption section 108 receives an instruction of transmission cancellation from the transmission cancellation control section 105 and receives, instead of the master 101 whose operation is stopped by reset, data from the shared slave 109. For example, if the read data bus 112 transmits data by means of a handshaking using a receiving enabled signal from the master 101 and the transmission request signal from the shared slave 109 in the same manner as the command bus 110 and the write data bus 111 described above, a receiving enabled signal to the shared slave 109 is asserted at all the time.

Figure 2:
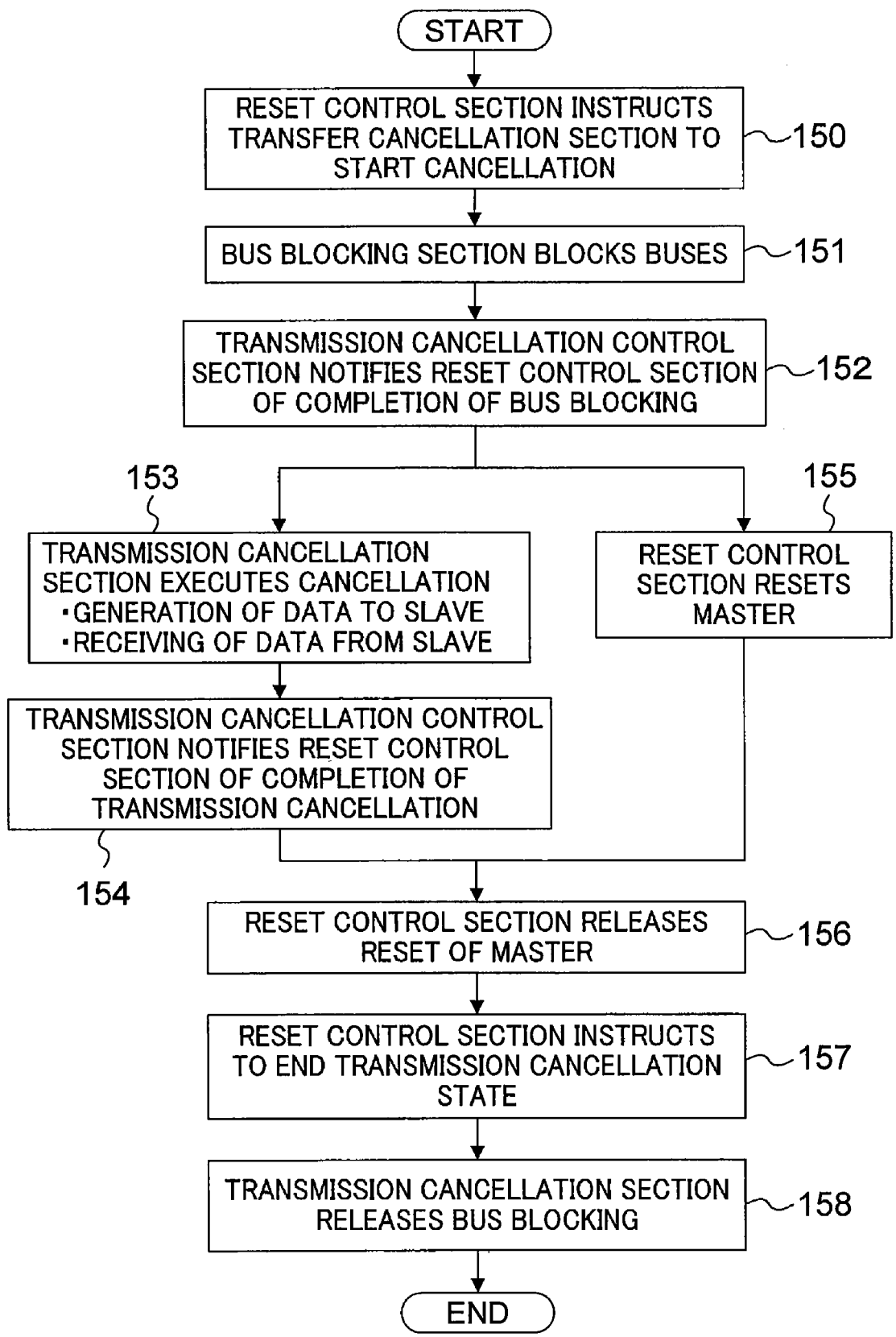
FIG. 2 is a flow chart of operation of the data processing system of FIG. 1.

FIG. 2 is a flow chart of the operation of the data processing system of FIG. 1. First, in Step 150, the transmission cancellation control section 105 in the transmission cancellation section 103 is notified from the reset control section 113 via the signal line 114 that the master 101 has to be reset and thus transmission cancellation is necessary. In response to this notification, the transmission cancellation control section 105 first instructs the bus blocking section 106 to perform bus blocking, thereby preventing invalid data from being transmitted to the shared slave 109 in Step 151. On completion of bus blocking, in Step 152, the transmission cancellation control section 105 notifies the reset control section 113 of the completion of bus blocking via the signal line 115.

When bus blocking is completed, the reset control section 113 resets the master 101 in Step 155. In parallel to Step 155, Step 153 is performed in which, instead of the master 101, the data generation section 107 and the data absorption section 108 in the transmission cancellation section 103 are operated to complete data transmission with the shared slave 109, thereby achieving transmission cancellation. On completion of the transmission cancellation, in Step 154, the transmission cancellation control section 105 notifies the reset control section 113 of the completion of transmission cancellation via the signal line 115.

Next, in Step 156, the reset control section 113 releases the reset of the master 101. Thereafter, in Step 157, the reset control section 113 instructs the transmission cancellation control section 105 to end the transmission cancellation state and, in response to the instruction, the transmission cancellation section 103 releases the bus blocking in Step 158.

With the above-described steps taken, when one master 101 is to be reset, a command remaining in the shared slave 109 can be substantially deleted without modifying the shared slave 109 for providing a special mechanism or the like to reset the master 101. By using the above-described command deleting method, it becomes possible to recover the system without disturbing the operation of the other master 102. A bus blocking mechanism on a bus can prevent an invalid command, which can be generated during resetting the master, from being sent to the shared slave 109.

Note that in FIG. 1, two masters and a single shared slave 109 are illustrated. However, the numbers of masters and the shared slaves may be arbitrarily determined and a bus can be formed in various configurations, for example, as a multilayer bus or like. In FIG. 1, transmission cancellation sections are provided between all masters and a slave, respectively. However, whether or not a transmission cancellation section is to be provided may be determined for each master.

In FIG. 1, the reset control section 113 instructs the transmission cancellation section 103 via the signal line 114. However, an instruction to the transmission cancellation section 103 may be given by a master such as a microprocessor and the like. It may be also arbitrarily determined which all the transmission cancellation sections 103 and 104 are controlled by a single block or they are separately controlled by separate blocks. Furthermore, the transmission cancellation control section 105 notifies the reset control section 113 of a state of the transmission cancellation section 103 via the signal line 115. However, to notify a microprocessor of a state of the transmission cancellation section 103, a register readable from a microprocessor may be provided, and the state may be notified by an interrupt to the microprocessor.

In the above description, during a transmission cancellation operation, the bus blocking section 106 does not receive a command and data from the master 101 so that the master 101 holds the command and data, and the command and data are deleted by a reset of the master 101. However, a command and data can be first received by the bus blocking section 106 and then deleted in the bus blocking section 106. In this case, a receiving enabled signal to the master 101 is asserted and a transmission request signal to the shared slave 109 is negated.

In a configuration in which the shared slave 109 receives data exceeding a data amount requested by a command, the function of calculating a deficit data amount for a preceding command can be provided in the data generation section 107 to send only deficit data from the data generation section 107 to the shared slave 109.

Second Embodiment

Figure 3:
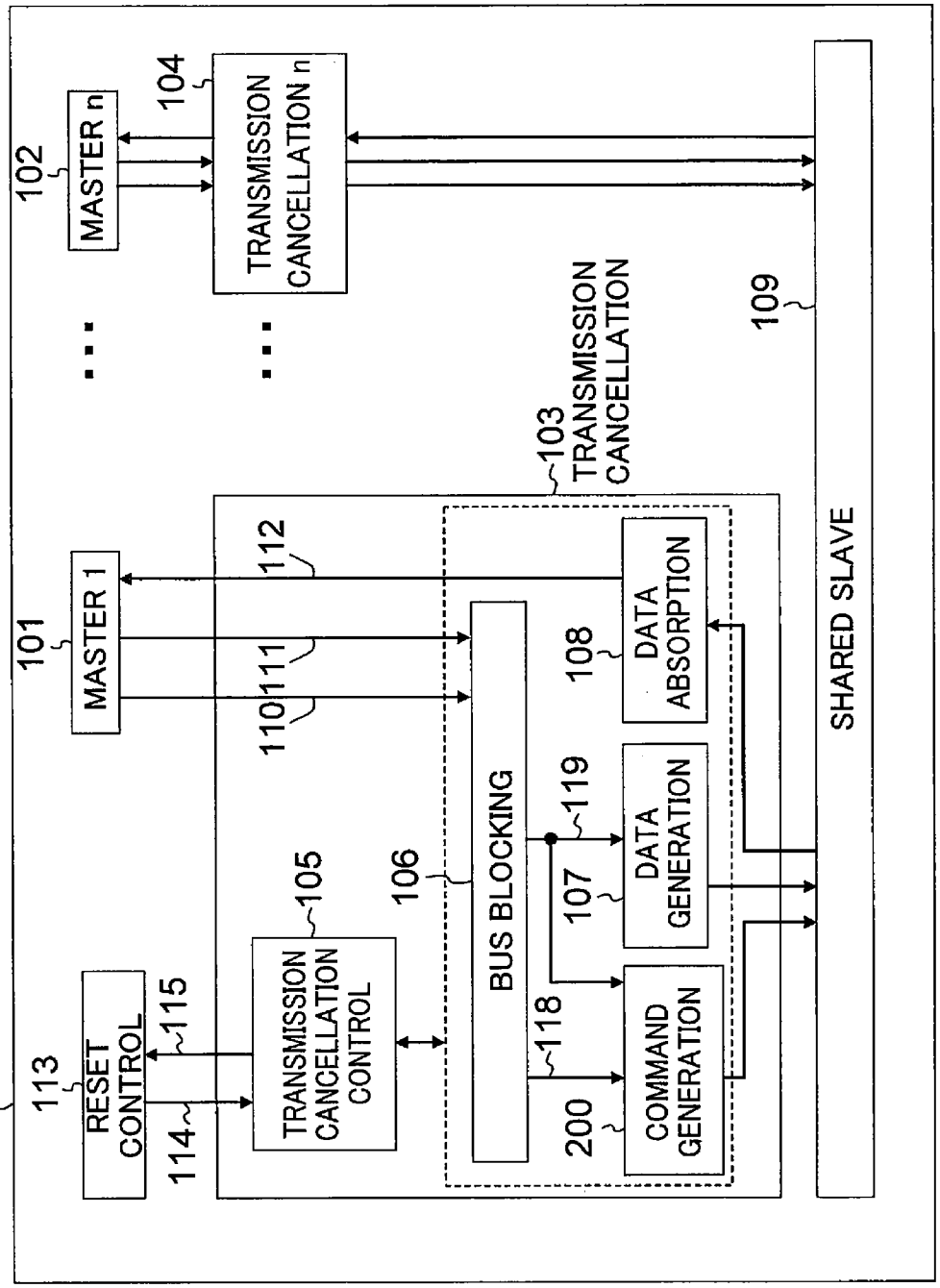
FIG. 3 is a block diagram of a data processing system according to a second embodiment of the present invention.

FIG. 3 is a block diagram illustrating a configuration of a data processing system according to a second embodiment of the present invention. FIG. 3 shows a configuration obtained by adding a command generation section 200 to the transmission cancellation section 103 in the semiconductor integrated circuit 100 of FIG. 1 so that the command generation section 200 is located on the command output signal line 118 of the bus blocking section 106.

Figure 4:
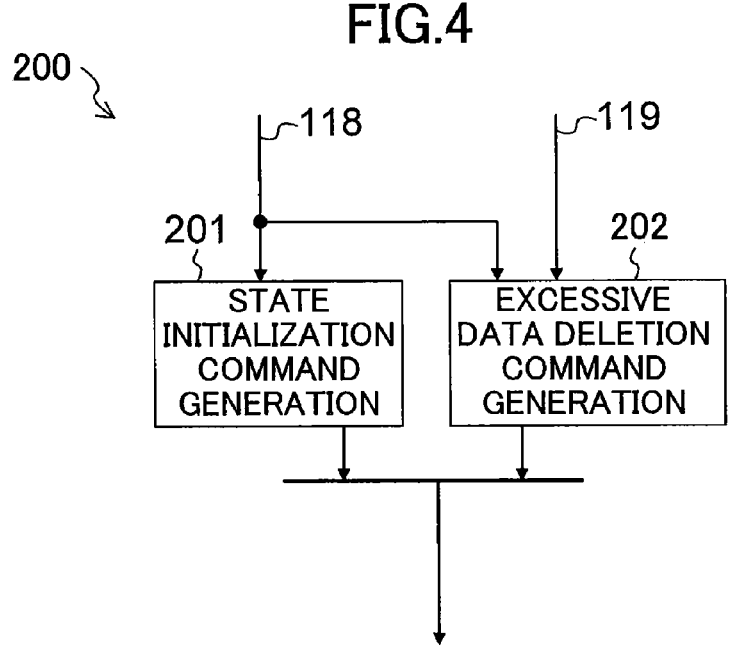
FIG. 4 is a block diagram illustrating an exemplary configuration of a command generation section of FIG. 3 in detail.

FIG. 4 is a diagram illustrating an exemplary configuration of the command generation section 200 of FIG. 3 in detail. As shown in FIG. 4, the command generation section 200 includes a state initialization command generation section 201 and an excessive data deletion command generation section 202.

The state initialization command generation section 201 issues a command for initializing a state machine provided in the shared slave 109 during a transmission cancellation operation. In this embodiment, the case where a command for instructing to occupy the shared slave 109 and a command for releasing such occupancy are defined by a bus protocol and a state machine which expresses an occupancy state of the shared slave 109 is provided in the shared slave 109 will be described as an example. In this case, in Step 153 of FIG. 2, an occupancy releasing command for the shared slave 109 is generated by the state initialization command generation section 201, whereby the state of the shared slave 109 can be initialized to prevent the other master 102 from staying inaccessible to the shared slave 109 even when the master 101 is reset while the shared slave 109 is occupied.

The excessive data deletion command generation section 202 is a block for generating a command for deleting preceding data in the shared slave 109 when the shared slave 109 is a circuit capable of receiving data ahead of a command. Specifically, the excessive data deletion command generation section 202 monitors data preceding a command and issues a necessary command for completing processing of data in the shared slave 109. As an example, if the shared slave 109 is a memory and has a buffer capable of receiving data ahead of a write-in command, the excessive data deletion command generation section 202 monitors a data amount of preceding data and issues a command for writing all the data in any addresses in the memory to complete the write-in of the data into the memory, thereby deleting remaining data in the buffer in the shared slave 109.

With the above-described configuration, even when the shared slave 109 changes its internal state according to a command or when the shared slave 109 is capable of receiving data ahead of a command, the effect of a master reset described in the first embodiment can be achieved.

The command generation section 200 does not necessarily have to include the state initialization command generation section 201 and the excessive data deletion command generation section 202 both but may include either one of the state initialization command generation section 201 and the excessive data deletion command generation section 202. Also, as long as the state machine is so configured to initialize the sate of the shared slave 109 according to a command from a bus, an arbitrary state can be initialized.

To complete processing in the shared slave 109, consideration of preventing disturbance of the operation of the shared slave 109 has to be taken. In the above-described example of data writing into a memory, an address which causes no problem even if invalid data is written in the address has to be selected and like consideration is needed. It is effective that setting of a write-in address is changeable by software.

Third Embodiment

FIG. 5 is a block diagram illustrating a configuration of a data processing system according to a third embodiment of the present invention. FIG. 5 shows a configuration obtained by adding an invalid data flag generation section 300 to the transmission cancellation section 103 in the semiconductor integrated circuit 100 of FIG. 1 so that the invalid data flag generation section 300 is located on the write data output signal line 119 of the bus blocking section 106.

As an example, the write data bus 111, the write data output signal line 119 and the shared slave 109 correspond to byte mask signals expressing in terms of byte whether or not data is valid. The invalid data flag generation section 300 is so configured that if dummy data to the shared slave 109 is generated in Step 153 of the operation flow chart of FIG. 2, the invalid data flag generation section 300 expresses invalidity of data using the byte mask signals. Thus, even when invalid data generated by the data generation section 107 is written in any address in the shared slave 109, it is possible to protect valid data of the shared slave 109 from being overwritten.

In this embodiment, byte mask signals are used as signals expressing validity/invalidity of data. However, arbitrary signals expressing invalidity of data can be added according to a bus to be used.

Fourth Embodiment

Figure 6:
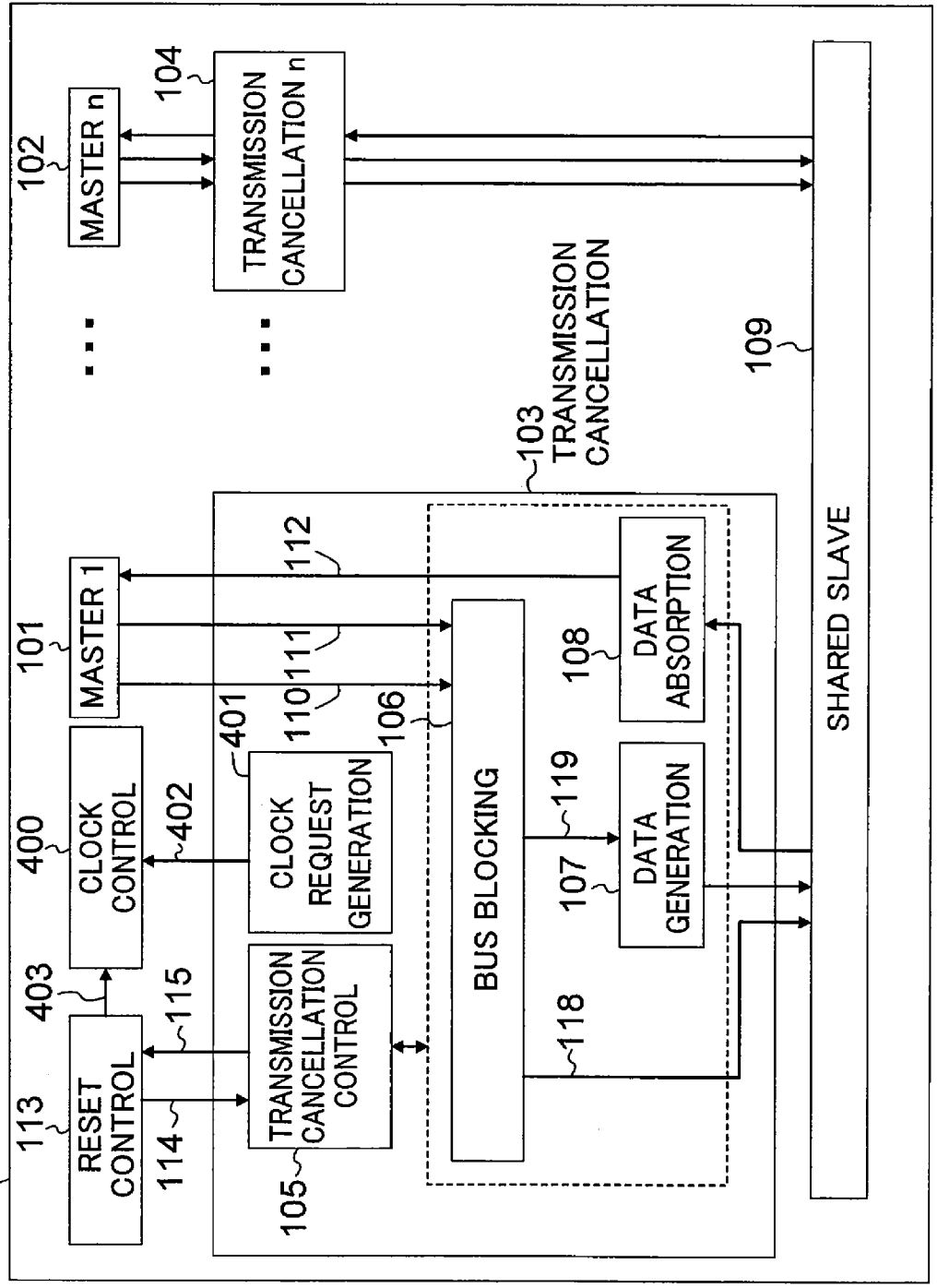
FIG. 6 is a block diagram of a data processing system according to a fourth embodiment of the present invention.

FIG. 6 is a block diagram illustrating a configuration of a data processing system according to a fourth embodiment of the present invention. FIG. 6 shows a configuration obtained by adding a clock request generation section 401 to the transmission cancellation section 103 in the semiconductor integrated circuit 100 of FIG. 1.

When the system is operated in a normal manner, the transmission cancellation section 103 does not have to be operated. The transmission cancellation section 103 let commands and data of the buses 110, 111 and 112 pass as they are.

To reduce power consumption, a clock request signal is generated in the clock request generation section 401 only when necessary.

An exemplary operation of the clock request generation section 401 will be described. The clock request generation section 401 requests, via a signal line 402, a clock control section 400 which controls a clock of each block in the semiconductor integrated circuit 100 to supply a clock to the transmission cancellation section 103. Thereafter, the clock request generation section 401 monitors a state of the transmission cancellation section 103 and requests the clock control section 400 to stop the clock supply at a time when a transmission cancellation operation is completed and the reset control section 113 is notified of the completion.

With the above-described configuration, power consumption of the transmission cancellation section 103 added for the purpose of transmission cancellation can be suppressed at a minimum.

In the above description, clock supply in the transmission cancellation section 103 is collectively requested. However, clocks of each block in the transmission cancellation section 103 can be individually controlled, thereby performing power control in a more detailed manner. Moreover, in the above-described example, the clock request generation section 401 directly instructs the clock control section 400 via the signal line 402. However, a clock supply request can be given in such a manner that a clock supply request is first notified to the reset control section 113 via the signal line 115 and then the reset control section 113 requests the clock control section 400 via a signal line 403, or some other arbitrary request path can be set. Furthermore, if clocks in the transmission cancellation section 103 are collectively managed, clock supply can be controlled not according to the clock request generation section 401 but only according to a state of the reset control section 113.

Fifth Embodiment

Figure 7:
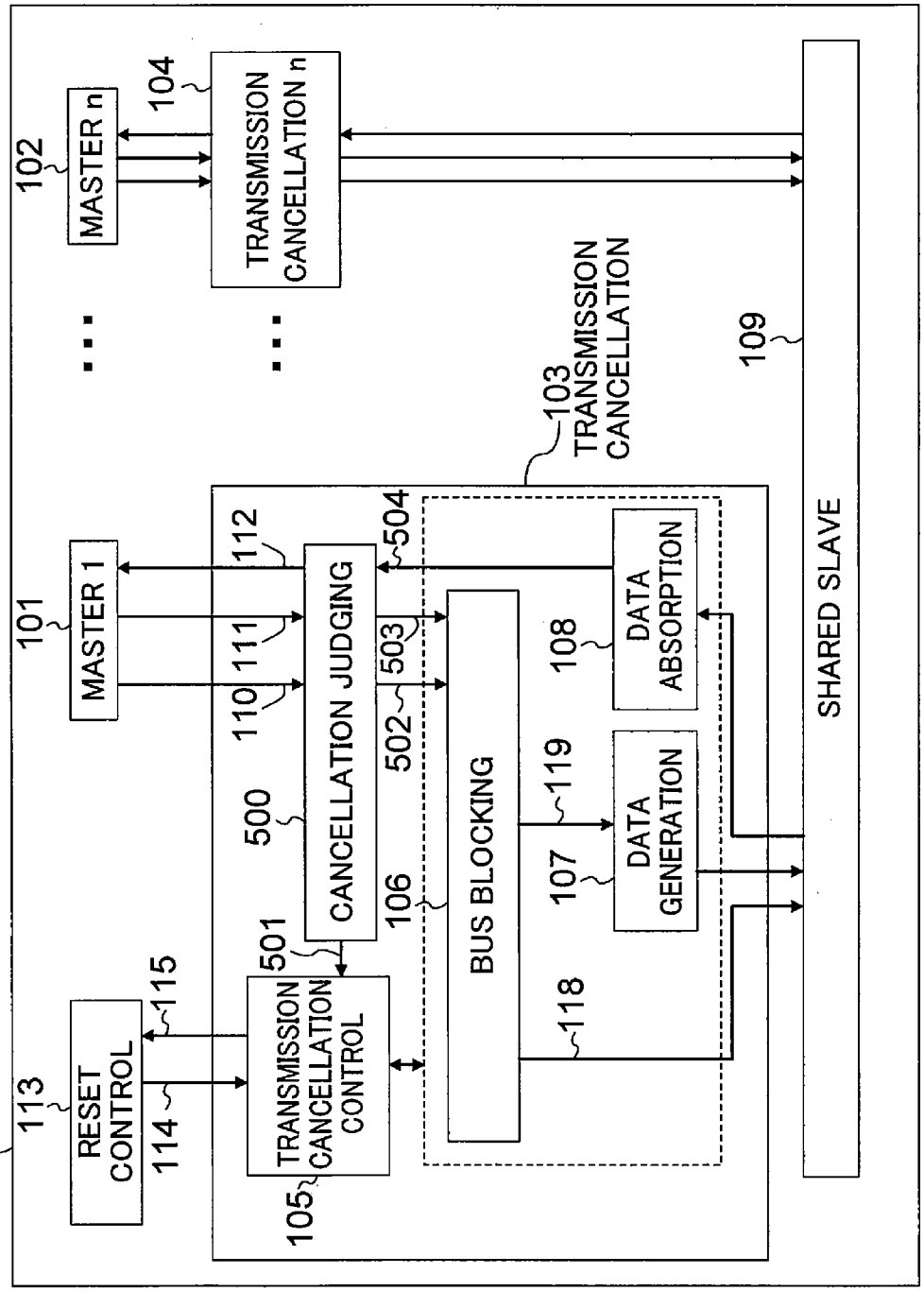
FIG. 7 is a block diagram of a data processing system according to a fifth embodiment of the present invention.

FIG. 7 is a block diagram illustrating a configuration of a data processing system according to a fifth embodiment of the present invention. FIG. 7 shows a configuration obtained by adding a cancellation judging section 500 to the transmission cancellation section 103 of the semiconductor integrated circuit 100 of FIG. 1.

Figure 8:
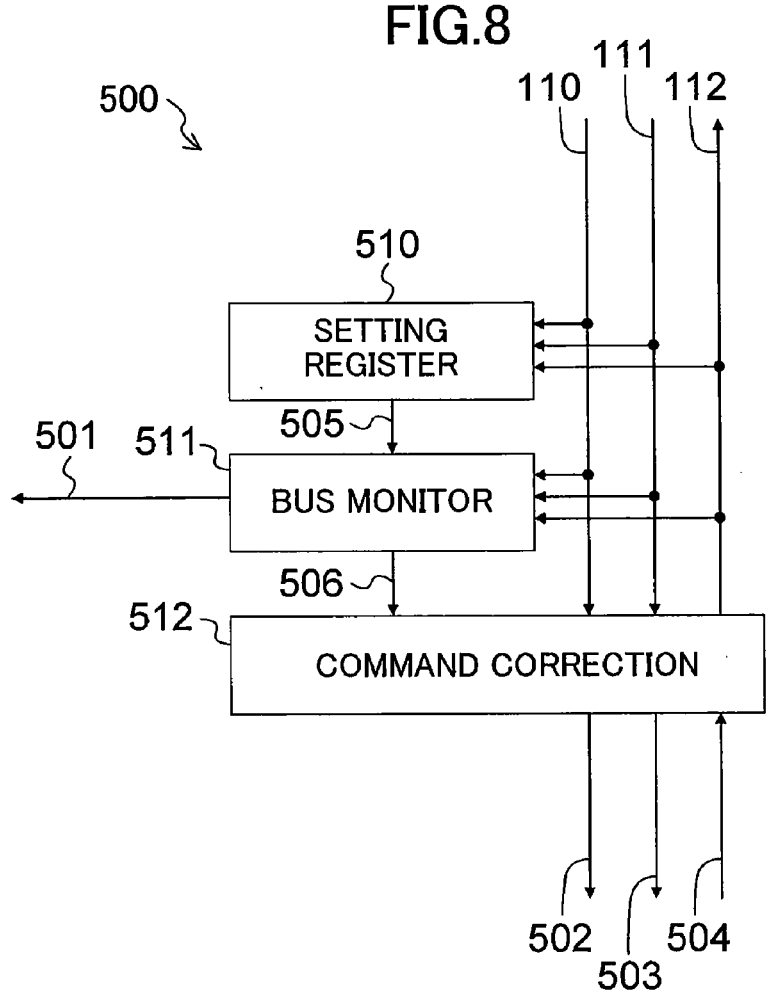
FIG. 8 is a block diagram illustrating an exemplary configuration of a cancellation judging section of FIG. 7 in detail.

FIG. 8 is a diagram illustrating an exemplary configuration of the cancellation judging section 500 of FIG. 7 in detail. As shown in FIG. 8, the cancellation judging section 500 includes a setting register 510, a bus monitor 511 and a command correction section 512. The bus monitor 511 monitors the buses 110, 111 and 112. Then, when detecting transmission that matches a monitor condition notified from the setting register 510 via a signal line 505, the bus monitor 511 instructs via a signal line 501 the transmission cancellation control section 105 to execute transmission cancellation and, as necessary, instructs via a signal line 506 the command correction section 512 to correct a command. As necessary, the transmission cancellation control section 105 notifies the reset control section 113 of the occurrence of transmission cancellation via the signal line 115. Note that 502, 503 and 504 of FIG. 7 and FIG. 8 denote buses, which correspond to the buses 110, 111 and 112, respectively.

Items that the bus monitor 511 monitors will be described. First, the occurrence of a command or data in other format than a predetermined format is detected by the buses 110, 111 and 112. In this case, it is effective that a detected command is corrected by the command correction section 512 so that the command, which violates conditions, is prevented from causing a misoperation of the shared slave 109. This can prevent influences of such a violation command generated by a misoperation of one master on operations of the shared slave 109 and the other master.

The bus monitor 511 also has the function of detecting that an access to an address specified by the setting register 510 has been made and data in the format specified by the setting register 510 has been transmitted. In this case, it is effective that a command is corrected by the command correction section 512 so as not to influence the shared slave 109. Thus, it is possible to prevent influences of an access from one master on operations of the shared slave 109 and the other master.

The bus monitor 511 also has the function of detecting a hang-up of a master by means of monitoring of the buses 110, 111 and 112. For example, a method in which it is detected based on a result of counting by a counter that data corresponding a command issued to the shared slave 109 is not transmitted from a master for a long period of time is an example of the detection method. Thus, inconveniences such as a load kept being imposed on the shared slave 109 by a hang-up of one master and the like can be prevented.

In FIG. 8, conditions are set for the setting register 510 via the buses 110, 111 and 112. However, a separate bus for condition setting may be provided. It is also possible not to provide a setting change mechanism using the setting register 510 but to specify a fixed value in advance. Moreover, whether or not the setting register 510 and the command correction section 512 are provided is arbitrarily determined. Final decision on whether or not to execute transmission cancellation can be made arbitrarily by using one of the cancellation judging section 500 and the reset control section 113 or by using both of the cancellation judging section 500 and the reset control section 113 to perform majority vote of signals from each of the cancellation judging section 500 and the reset control section 113.

In the aforementioned description, an address and data are individually monitored by the bus monitor 511. However, a combination of an address and data or a series of addresses and data can be detected. Also, in the aforementioned description, the command correction section 512 corrects a command. However, a command which is inconvenient for the shared slave 109 can be deleted.

The bus monitor 511 does not necessarily need to have all the above-described detection functions. It is also effective to allow the setting register 510 to express whether to execute each detection.

As has been described above, a data processing system according to the present invention allows performing a master reset without causing influences on operation of the entire system and thus is useful in electronic apparatus or the like, having the mechanism for performing reset and recovery while a maser is operated.

What is claimed is:

1. A data processing system comprising:
    a master and a slave for performing data communication therebetween; and
    a transmission cancellation section which executes and completes a transmission operation between the master and the slave when the master is in a state of being incapable of executing a data transmission operation,
    wherein the transmission cancellation section includes
    a bus blocking section for blocking issuance of a command and transmission of data from the master to the slave,
    a data generation section for generating, instead of the master, data to be sent to the slave according to the command already issued to the slave, a data absorption section for receiving, instead of the master, response data corresponding to the command already issued to the slave and output from the slave, and a transmission cancellation control section for controlling the bus blocking section, the data generation section and the data absorption section.

2. The data processing system of claim 1, further comprising:

another master sharing the slave with the master; and another transmission cancellation section which executes and completes a transmission operation between said another master and the slave when said another master is in a state of being incapable of executing a data transmission operation.

3. The data processing system of claim 1, wherein the transmission cancellation section further includes a command generation section for generating a command, instead of the master, and the command generation section generates a command for initializing a state machine in the slave.

4. The data processing system of claim 1, wherein the transmission cancellation section further includes a command generation section for generating a command, instead of the master, and the command generation section generates a command for completing processing of data sent to the slave ahead of the command.

5. The data processing system of claim 1, wherein the transmission cancellation section further includes an invalid data flag generation section for generating a flag for notifying the slave that the data generated for the slave by the data generation section is invalid data.

6. The data processing system of claim 1, wherein the transmission cancellation section further includes a clock request generation section for generating a signal expressing necessity of clock supply to the transmission cancellation section.

7. The data processing system of claim 1, wherein the transmission cancellation section further includes a cancellation judging section for judging necessity of transmission cancellation.

8. The data processing system of claim 7, wherein the cancellation judging section includes a bus monitor for monitoring a command and data from the master, and the transmission cancellation section performs transmission cancellation when the bus monitor detects a bus protocol violation.

9. The data processing system of claim 8, wherein the cancellation judging section includes a command correction section for correcting a command of a bus protocol violation.

10. The data processing system of claim 7, wherein the cancellation judging section includes a bus monitor for monitoring a command and data from the master, and the transmission cancellation section performs transmission cancellation when the bus monitor detects an access to a specified address region.

11. The data processing system of claim 7, wherein the cancellation judging section includes a bus monitor for monitoring a command and data from the master, and the transmission cancellation section performs transmission cancellation when the bus monitor detects transmission of data matching a specified value.

12. The data processing system of claim 7, wherein the cancellation judging section monitors a bus monitor for monitoring a command and data from the master, and the transmission cancellation section performs transmission cancellation when the bus monitor detects a hang-up of the master.

13. The data processing system of claim 12, wherein the bus monitor detects the hang-up of the master, based on a result of counting at intervals corresponding to command issuance to the slave or transmission of data to the slave.

14. An electronic apparatus comprising:

a power supply device; and a semiconductor integrated circuit having a power control function, wherein the semiconductor integrated circuit includes the data processing system of claim 1 and controls, according to a state of the transmission cancellation section, power supply from the power supply device to each block in the semiconductor integrated circuit.

15. A method for resetting a data processing system which includes a plurality of masters and a shared slave, the method comprising:

a first step of blocking issuance of a command and transmission of data from one of the masters to be reset to the shared slave;

a second step of performing, after completion of the first step, a reset of the one of the masters to be reset;

a third step of generating data to be sent to the shared slave according to a command issued to the shared slave to send the generated data to the shared slave, instead of the one of the masters to be reset, and receiving response data from the shared slave corresponding to the command already issued to the shared slave to discard the response data, instead of the one of the masters to be reset, the third step being performed in parallel to the second step, and a fourth step of releasing, after completion of the third step, a reset of the one of the masters to be reset.

* * * * *